United States Patent [19]

King

[11] 4,013,326
[45] Mar. 22, 1977

[54] GAS BEARING ROLL SHELL ASSEMBLY WITH PRELOAD MEANS

[75] Inventor: Donald J. King, Huron, Ohio

[73] Assignee: General Motors Corporation, Detroit, Mich.

[22] Filed: Apr. 2, 1976

[21] Appl. No.: 673,286

[52] U.S. Cl. .................................. 308/9; 308/107; 308/DIG. 1
[51] Int. Cl.² ...................................... F16C 17/16
[58] Field of Search ................. 308/9, 107, DIG. 1

[56] References Cited

UNITED STATES PATENTS

| 3,374,039 | 3/1968 | Voorhies | 308/107 |
|---|---|---|---|
| 3,527,510 | 9/1970 | Christiansen | 308/107 |
| 3,718,379 | 2/1973 | Williams et al. | 308/9 |
| 3,758,177 | 9/1973 | Williams | 308/9 |
| 3,938,863 | 2/1976 | Victor et al. | 308/9 |

Primary Examiner—Joseph F. Peters, Jr.
Assistant Examiner—Gene A. Church
Attorney, Agent, or Firm—F. J. Fodale

[57] ABSTRACT

A roll shell assembly such as is used in textile equipment has a roll shell rotatably supported on a gas bearing of the externally pressurized type. The assembly incorporates a pressure chamber at one end of the roll shell which preloads the roll shell against a gas thrust bearing at the other end of the roll shell to eliminate end play when external thrust loads are applied.

2 Claims, 3 Drawing Figures

U.S. Patent  Mar. 22, 1977  4,013,326
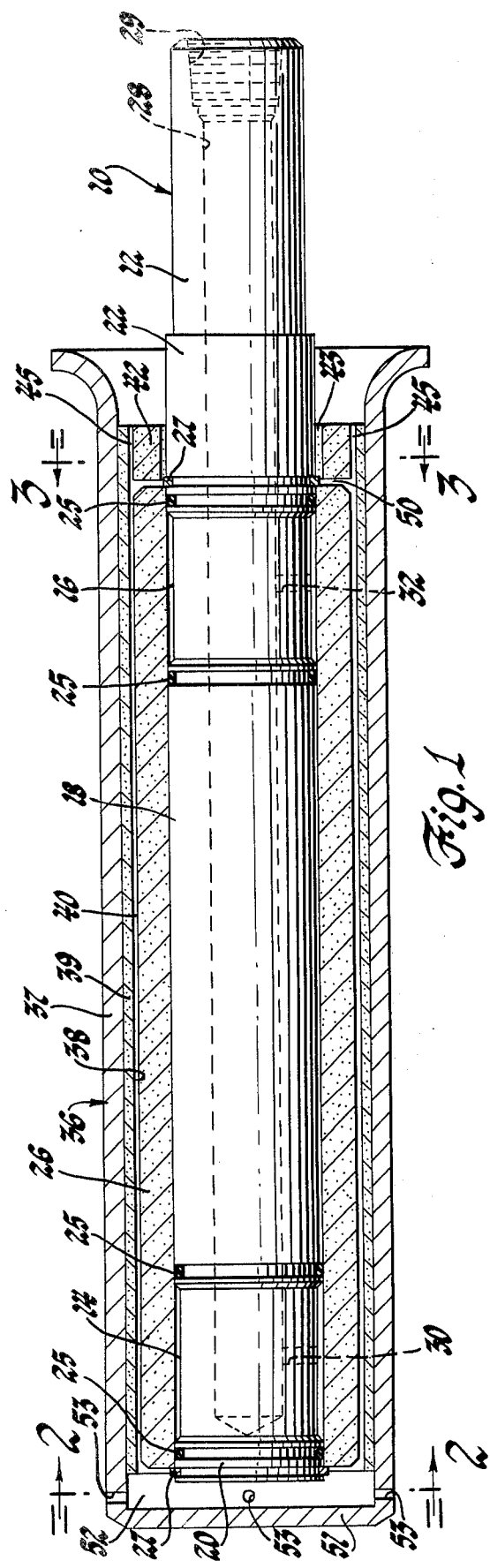
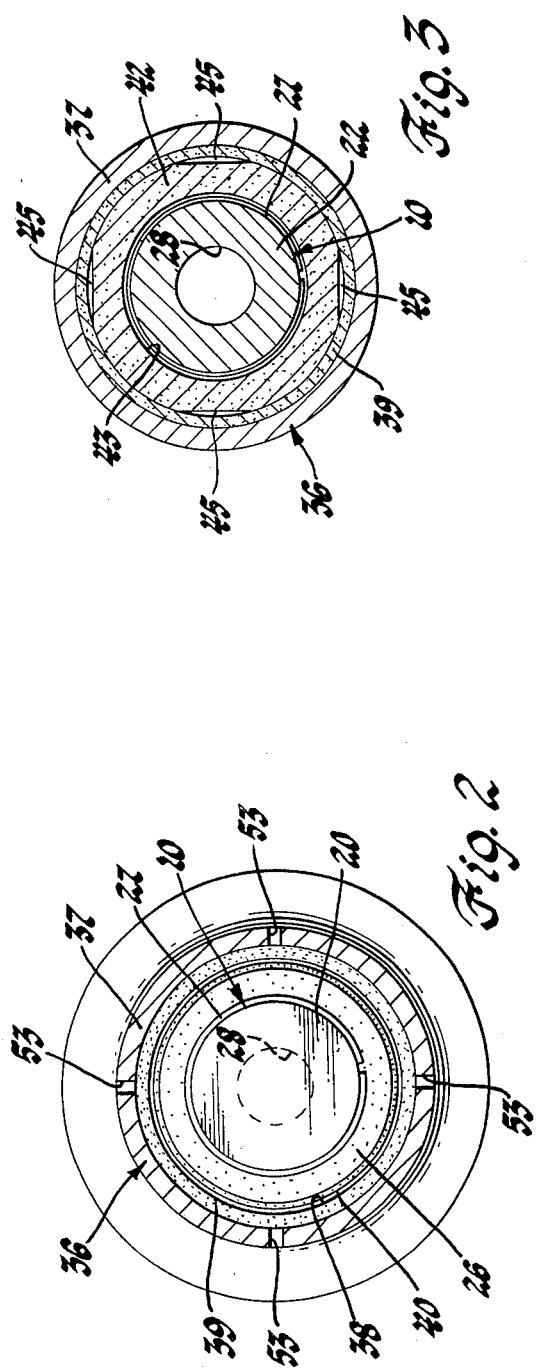

GAS BEARING ROLL SHELL ASSEMBLY WITH PRELOAD MEANS

This invention relates generally to a roll shell assembly used in textile machines and the like, and more particularly to a gas bearing roll shell assembly in which the roll shell is rotatably supported on an externally pressurized gas or air bearing Known roll shells such as those disclosed in U.S. Pat. No. 3,374,039 issued to Donald A. Voorhies on Mar. 19, 1968 for an "Antifriction Bearing" and U.S. Pat. No. 3,527,510 issued to Paul J. Christiansen on Sept. 8, 1970 for an "Antihammer Device for Air Spindles" have a certain amount of end play in response to external thrust loads such as are usually encountered by roll shell assemblies used in textile machines which wind packages of thread or yarn at high rates of speed. The end play in the roll shell assemblies results from the fact that it is difficult to achieve stiff gas thrust bearings between the interior end faces of the annular rings carried by the roll shell and juxtaposed cooperative annular end faces of the stationary axle or hub which would require precision parts spaced axially from each other a few thousandths of an inch.

Accordingly, it is the object of this invention to provide a gas bearing roll shell assembly which in operation is extremely stiff in the axial direction when external thrust loads up to a certain magnitude are applied.

Another object of the invention is to provide a gas bearing roll shell assembly which is preloaded in the axial direction to eliminate end play or axial movement of the roll shell with respect to the axle, when the roll shell is subjected to externally applied thrust loads up to a certain magnitude. Another object of the invention is to provide a bearing roll shell assembly having a roll shell rotatably supported by an externally pressurized gas bearing which has high stiffness characteristics in the axial direction which does not require the high precision parts of gas thrust bearings.

To these ends and also to improve generally upon devices of this character, the invention consists in the various matters hereinafter described and claimed. In its broader aspects, the invention is not necessarily limited to the specific embodiments shown by way of illustration wherein:

FIG. 1 is a longitudinal view, partially in cross section, of a preloaded gas bearing roll shell assembly in accordance with my invention;

FIG. 2 is a cross section taken substantially along the lines 2—2 of FIG. 1 and looking in the direction of the arrows; and FIG. 3 is a cross section taken substantially along the lines 3—3 of FIG. 1 and looking in the direction of the arrows.

Generally considered, my invention is illustrated in the form of a gas bearing roll shell assembly wherein a roll shell is radially supported and axially positioned under a preload for nearly friction-free rotation by a flowing gas which is uniformly distributed under pressure against a cylindrical wall of the roll shell through the evenly distributed interconnected pore structure of a porous supporting sleeve mounted on an axle.

As illustrated in FIG. 1, 2 and 3, there is provided an axle or hub 10 having an end portion, herein shown as a reduced portion 12, arranged to be held within a suitable support (not shown). The axle 10 is cylindrical and has a pair of axially spaced annularly extending external recesses or grooves 14 and 16 respectively located at opposite sides of an intermediate cylindrical portion 18 which has the same diameter as cylindrical portion 20 at the left end of the axle 10 and cylindrical portion 22 adjacent the end 12. A porous sleeve 26 is nonrotatably fitted on the axle 10 in sealing engagement with the cylindrical portions 18, 20 and 22 thus making the porous sleeve 26 and enlarged diameter portion of the axle 10 and the recesses 14 and 16, annular chambers between the axle 10 and the sleeve 26. The right end of the sleeve 26 terminates intermediate the length of the cylindrical portion 22 and the left end of the sleeve 26 similarly terminates intermediate the length of the cylindrical portion 20.

The porous sleeve 26 may be made from a sintered material having a substantially uniform intercommunicating pore structure throughout its entire body — this intercommunicating pore structure being of a size to uniformly disperse the flow of fluid under pressure therethrough. These intercommunicating pores are preferably very small and uniform in size and open through the outer walls of the sleeve in very closely spaced relation to each other. Suitable sleeves for this purpose have been constructed from sintered iron, bronze, ceramic materials, carbon, carbon-graphite mixtures, and from various plastics and other materials which are molded with a predetermined interconnected small pore structure.

As shown in the drawing the cylindrical portions 18, 20 and 22 have narrow circumferential grooves in which four elastomeric O-rings 25 are disposed. These O-rings provide excellent seals for the chambers formed by the recesses 14 and 16, remove the requirements for a heavy press fit between the sleeve 26 and the axle 10 and provide a limited resilient movement of the sleeve 26 in the radial direction to enhance the radial stability of the roll shell during operation. The cylindrical portions 20 and 22 may also have second narrow circumferential grooves carrying snap rings 27 to axially locate the sleeve 26 with respect to the axle 10.

An axial bore 28 extends into the axle 10 from an inlet 29 at the right end of axle 10 and communicates through generally radial passages 30 and 32 with the chambers 14 and 16 between the sleeve 26 and the axle 10. With this arrangement, fluid under pressure is distributed uniformly against the interior of the porus sleeve 26. An impervious rotatable roll shell 36 which may comprise an outer metal shell 37 and a non-metallic liner 39 of bearing material retained therein by a shrink fit has a cylindrical bore 38 which is in close surrounding relation about the cylindrical external surface 40 of the porous sleeve 26. The bore 38 and the cylindrical surface 40 are precisely dimensioned and the small radial clearance between their diameters may be as small as a fraction of a thousandth of an inch.

The radial space beyond the right end of the sleeve 26 which is between the roll shell 36 and the cylindrical axle portion 22 is materially closed by an annular thrust ring 42 press fitted in the cylindrical bore at the right end of the liner 39. The bore of the thrust ring 42 is spaced from the axle 10 with the radial clearance between the bore and the axle portion 22 normally being greater than the radial distance between the roll shell 36 and the sleeve 26. The annular opening 43 thus provided is an exhaust passage for gas to flow out of the roll shell. The thrust ring 42 also has four equally circumferentially spaced flats in its outer circumferential surface which provide exhaust passages 45 at the bore of the liner 39. The exhaust passages 45 when properly sized prevent an instability phenomenon in the axial direction known as air hammer as more fully explained in U.S. Pat. No. 3,527,510 granted Sept. 8, 1970 referred to hereinabove.

As best illustrated in FIG. 1, the roll shell 36 has a blind end provided by an end wall 51 of the outer metal shell 37. The end wall 51 is spaced the left end of the axle 10 forming a pressure chamber 52 which is in fluid communication with the gap between the liner 39 and the porous sleeve 26. The outer metal shell 37 has four equally circumferentially spaced exhaust vents 53. The vents 53 are advantageously located near the end wall 51 so that the vents 53 are in fluid communication with a relatively large annular pressure chamber even in the event that the left end face of the axle 10 abuts the end wall 51 in which case the left end face of the sleeve 26 is still located on the side of the vents 53 remote from the end wall 51.

In operation, a gas such as air is directed under pressure into the bore 28 of the axle and out through the passages 30 and 32 into the annular chambers 14 and 16. The closely spaced small interconnected pore structure which exists throughout the sleeve 26, evenly distributes the gas under reduced pressure into the small annular space between the outer cylindrical surface of the sleeve 26 and the inner cylindrical surface of the roll shell 36 thus supporting the roll shell for nearly friction-free rotation upon a thin annular body or layer of flowing gas. The manner of rotatably supporting the roll shell on a layer of flowing gas and the pressure regulating function of the porous sleeve 26 are well known. Suffice it to say that a relatively low gas pressure is sufficient to support the roll shell for nearly friction free rotation even when this roll shell is subjected to an appreciable radial load.

The gas under pressure between the porous sleeve 26 and the roll shell 36 then flows into the annular pocket 50 and the pressure chamber 52. The sleeve 26 is preferably porous in the axial direction so that gas under pressure also flows out the end faces into the pocket 50 and the pressure chamber 52. The gas under pressure flowing into the annular pocket 50 exhausts through the passages 43 and 45 while the gas flowing under pressure into the pressure chamber 52 exhausts through the vents 53. The gas under pressure in the pocket 50 and the chamber 52 axially positions the roll shell with respect to the sleeve 26 with little or no end play.

More specifically, the vent passages 53 are sized so that the vent passages provide a greater flow restriction than the exhaust pasages 43 and 45. Consequently, during operation a greater pressure develops in chamber 52 than in the pocket 50. The greater pressure developed in chamber 52 provides an axial preload between the axle 10 and the roll shell 36 which causes the roll shell 36 to assume an axial position with respect to the axle 10 such that the axial distance between the interior face of the thrust washer 42 and the right end face of the sleeve 26 is very small and sufficiently narrow so that the air flowing therebetween provides a stiff air thrust bearing which balances the preload.

I wish it to be understood that I do not desire to be limited to the exact details of construction shown and described, for obvious modifications will occur to a person skilled in the art.

What is claimed is:

1. A preloaded gas bearing roll shell assembly comprising:
   an axle having an enlarged diameter portion and supply passage means having an inlet adjacent a first axial end thereof adapted for connection to a source of gas under pressure,
   internal chamber means in said enlarged diameter portion in fluid communication with said supply passage means for receiving gas under pressure therefrom,
   and restrictive passage means through said enlarged diameter portion leading from said internal chamber means and onto an external circumferential surface thereof,
   a rotatable roll shell surrounding said enlarged diameter portion with a small radial clearance whereby said roll shell is adapted to be radially supported on a layer of gas supplied from said internal chamber via said restrictive passage means,
   said roll shell having an end wall adjacent an axial end thereof in juxtaposition to an axial end of said axle remote from said first axial end, and a thrust ring adjacent an opposite axial end therof in juxtaposition to an annular face of said enlarged diameter portion,
   exhaust passage means leading from said radial clearance past said thrust ring to ambient,
   axial preload means for maintaining said thrust ring in close proximity to said annular face comprising a pressure chamber in direct fluid communication with said radial clearance and defined at least in part by an end portion of said rotatable shell including said end wall, said end portion having vent means therethrough which is more flow restrictive than said exhaust passage means leading from said radial clearance past said thrust ring.

2. A preloaded gas bearing roll shell assembly comprising:
   an axle having an enlarged diameter portion and supply passage means having an inlet adjacent a first axial end thereof adapted for connection to a source of gas under pressure,
   internal chamber means in said enlarged diameter portion in fluid communication with said supply passage means for receiving gas under pressure therefrom,
   said enlarged diameter portion comprising a porous sleeve having exposed annular end faces and restrictive passage means therethrough leading from said internal chamber means and onto an exterior circumferential surface thereof,
   a rotatable roll shell surrounding said porous sleeve with a small radial clearance whereby said roll shell is adapted to be radially supported on a layer of gas supplied from said internal chamber via said restrictive passage means,
   said roll shell having an end wall adjacent an axial end thereof in juxtaposition to a second axial end of said axle remote from said first axial end, and a thrust ring adjacent an opposite axial end thereof in juxtaposition to an exposed annular end face of said porous sleeve,
   exhaust passage means leading from said radial clearance past said thrust ring to ambient,
   axial preload means for maintaining said thrust ring in close proximity to said exposed annular end face comprising a pressure chamber in direct fluid communication with said radial clearance and defined at least in part by an opposite exposed annular end face of said porous sleeve, which is spaced from said second axial end of said axle toward said first axial end, and an end portion of said rotatable shell adjacent said end wall, said end portion having radial vent means therethrough which is more flow restrictive than said exhaust passage means leading from said radial clearance past said thrust ring, said radial vent means being located sufficiently close to said end wall that said opposite exposed annular end face of said porous sleeve is always located on the side of said vent means remote from said end wall.

* * * * *